US008069239B2

(12) United States Patent
Trochman

(10) Patent No.: US 8,069,239 B2
(45) Date of Patent: Nov. 29, 2011

(54) CENTRALIZED MONITOR AND CONTROL SYSTEM FOR LABORATORY INSTRUMENTS

(75) Inventor: Allan Trochman, Corona, CA (US)

(73) Assignee: Beckman Coulter, Inc., Brea, CA (US)

( * ) Notice: Subject to any disclaimer, the term of this patent is extended or adjusted under 35 U.S.C. 154(b) by 1033 days.

(21) Appl. No.: 10/895,265

(22) Filed: Jul. 20, 2004

(65) Prior Publication Data

US 2007/0282997 A1 Dec. 6, 2007

(51) Int. Cl.
*G06F 15/16* (2006.01)

(52) U.S. Cl. ........ 709/224; 709/204; 709/218; 348/135; 348/143

(58) Field of Classification Search .................. 709/203, 709/217–219, 223–225, 248, 204; 348/135, 348/143
See application file for complete search history.

(56) References Cited

U.S. PATENT DOCUMENTS

| | | | | |
|---|---|---|---|---|
| 5,381,470 | A * | 1/1995 | Cambray et al. | 379/216.01 |
| 5,594,426 | A * | 1/1997 | Ushijima et al. | 340/825.02 |
| 5,768,614 | A | 6/1998 | Takagi et al. | |
| 5,987,234 | A | 11/1999 | Hirosawa et al. | |
| 6,141,647 | A | 10/2000 | Meijer et al. | |
| 6,370,574 | B1 * | 4/2002 | House et al. | 709/224 |
| 6,388,658 | B1 | 5/2002 | Ahern et al. | |
| 6,615,272 | B1 | 9/2003 | Ambrose | |
| 6,671,756 | B1 | 12/2003 | Thomas et al. | |
| 6,681,250 | B1 | 1/2004 | Thomas et al. | |
| 2002/0035497 | A1 * | 3/2002 | Mazereeuw et al. | 705/7 |
| 2002/0091850 | A1 * | 7/2002 | Perholtz et al. | 709/231 |
| 2002/0143996 | A1 | 10/2002 | Odryna et al. | |
| 2002/0158889 | A1 | 10/2002 | Sameshima et al. | |
| 2004/0015615 | A1 | 1/2004 | Liu | |
| 2004/0064198 | A1 | 4/2004 | Reynolds et al. | |
| 2004/0088115 | A1 * | 5/2004 | Guggari et al. | 702/13 |
| 2005/0066000 | A1 * | 3/2005 | Liaw et al. | 709/204 |
| 2005/0076102 | A1 * | 4/2005 | Chen et al. | 709/220 |
| 2005/0125519 | A1 * | 6/2005 | Yang et al. | 709/223 |
| 2005/0132403 | A1 * | 6/2005 | Lee et al. | 725/38 |
| 2005/0137653 | A1 * | 6/2005 | Friedman et al. | 607/60 |
| 2005/0146606 | A1 * | 7/2005 | Karsenty et al. | 348/143 |
| 2005/0275614 | A1 * | 12/2005 | Kim et al. | 345/100 |

OTHER PUBLICATIONS

"Remote Workstation Monitoring Method and System", IBM Technical Disclosure Bulletin, IBM Corp., New York, US, vol. 41, No. 1, 1998, pp. 325-328.
Kimara A: "KVM Switch Solutions", White Paper, Network Technologies, Inc., Mar. 1, 2001.
International Business Machines Corporation 459214: "OCR Screen Reader", Research Disclosure, Kenneth Mason Publications, Westbourne, GB, vol. 459, No. 214, Jul. 2002.

(Continued)

*Primary Examiner* — David Lazaro
(74) *Attorney, Agent, or Firm* — Merchant & Gould PC

(57) ABSTRACT

A laboratory computer network is set forth. The laboratory computer network comprises a plurality of laboratory instrument workstations connected to respective laboratory instruments. Each laboratory instrument workstation is adapted to provide video screen data indicative of the operational status of the respective laboratory instrument. A transmission medium is provided to transmit video screen data from each of the plurality of laboratory instrument workstations. A central server is also provided. The central server is adapted to receive the video screen data from the transmission media. The central server monitors one or more screen sections of the video screen data received from each of the plurality of laboratory instrument workstations and provides an alert in response to a given visual state of the monitored screen sections of each laboratory instrument workstation.

26 Claims, 7 Drawing Sheets

OTHER PUBLICATIONS

QNX Realtime Operating System Overview. Website [online]. QNX Software Systems, 2004 [retrieved Jul. 7, 2004]. Retrieved from the internet: <URL: www.qnx.com/products/rtos/index.html>.

QNX User Interface. Website [online]. QNX Software Systems, 2004 [retrieved Jul. 7, 2004]. Retrieved from the internet: <URL: www.qnx.com/products/ui/phindows.index.html>.

* cited by examiner 55
115
Monitor

115
LANGUAGE
125
ABOUT
130
120
140
Connect
145
Disconnect
150
Monitor Selection
155
Instrument 1
135a
Instrument 2
135b
Instrument 3
135c
Instrument 4
135d
Instrument 5
135e 115
LANGUAGE
125
ABOUT
130
120
Instrument 1
135a
Instrument 2
135b
Instrument 3
135c
Instrument 4
135d
Instrument 5
135e

CENTRALIZED MONITOR AND CONTROL SYSTEM FOR LABORATORY INSTRUMENTS

FIELD OF THE INVENTION

The present invention is generally directed to computers and computer network systems used in multi-laboratory instrument environments. More particularly, the present invention is directed to a centralized monitor and control system for laboratory instruments

BACKGROUND OF THE INVENTION

Laboratory environments typically include a wide range of automated sample handling and analysis apparatus that are capable of executing a variety of different processes (i.e., various assays, blood counting, etc.). Programming and monitoring of each individual laboratory instrument is generally facilitated by an individual workstation that is unique to the laboratory instrument that is being programmed and monitored. Each workstation is exclusively designed to execute user interface programming and provide status alerts that are specific to the corresponding laboratory instrument. Typically, each workstation is located in close proximity to the laboratory instrument under its control.

To ensure optimum utilization of the laboratory instruments, the instruments are operated concurrently within the laboratory environment. As such, there are a number of laboratory instruments carrying out different processes at the same time. Such overlapping operation, however, can be problematic. Laboratory workers must divide their attention between workstations at different locations to ensure that the various instruments are operating properly.

One manner of reducing labor intensive activities in the laboratory has been addressed by the DL2000® Data Manager system developed by Beckman Coulter, Inc. The DL2000® system includes laboratory instrument management software that is executed on a server system. The software collects and manages data and workflow for a number of different laboratory instruments. The data management capabilities include automatic results validation, delta checking, reflex testing, quality control, results editing, and archiving and restoring of patient results. Multiple DL2000® systems can be networked to use a single common database.

The DL2000® system is principally adapted to manage, schedule and catalog patient tests and test results. As such, the operational status of each laboratory instrument must still be monitored at the individual laboratory instrument workstations. The present inventor has recognized and addressed the need for centralized monitoring of the operational status of the individual laboratory instrument.

SUMMARY OF THE INVENTION

A laboratory computer network is set forth. The laboratory computer network comprises a plurality of laboratory instrument workstations connected to respective laboratory instruments. Each laboratory instrument workstation is adapted to provide video screen data indicative of the operational status of the respective laboratory instrument. A transmission medium is provided to transmit video screen data from each of the plurality of laboratory instrument workstations. A central server is also provided. The central server is adapted to receive the video screen data from the transmission media. The central server monitors one or more screen sections of the video screen data received from each of the plurality of laboratory instrument workstations and provides an alert in response to a given visual state of the monitored screen sections of each laboratory instrument workstation.

DESCRIPTION OF A PREFERRED EMBODIMENT OF THE INVENTION

Figure 1:
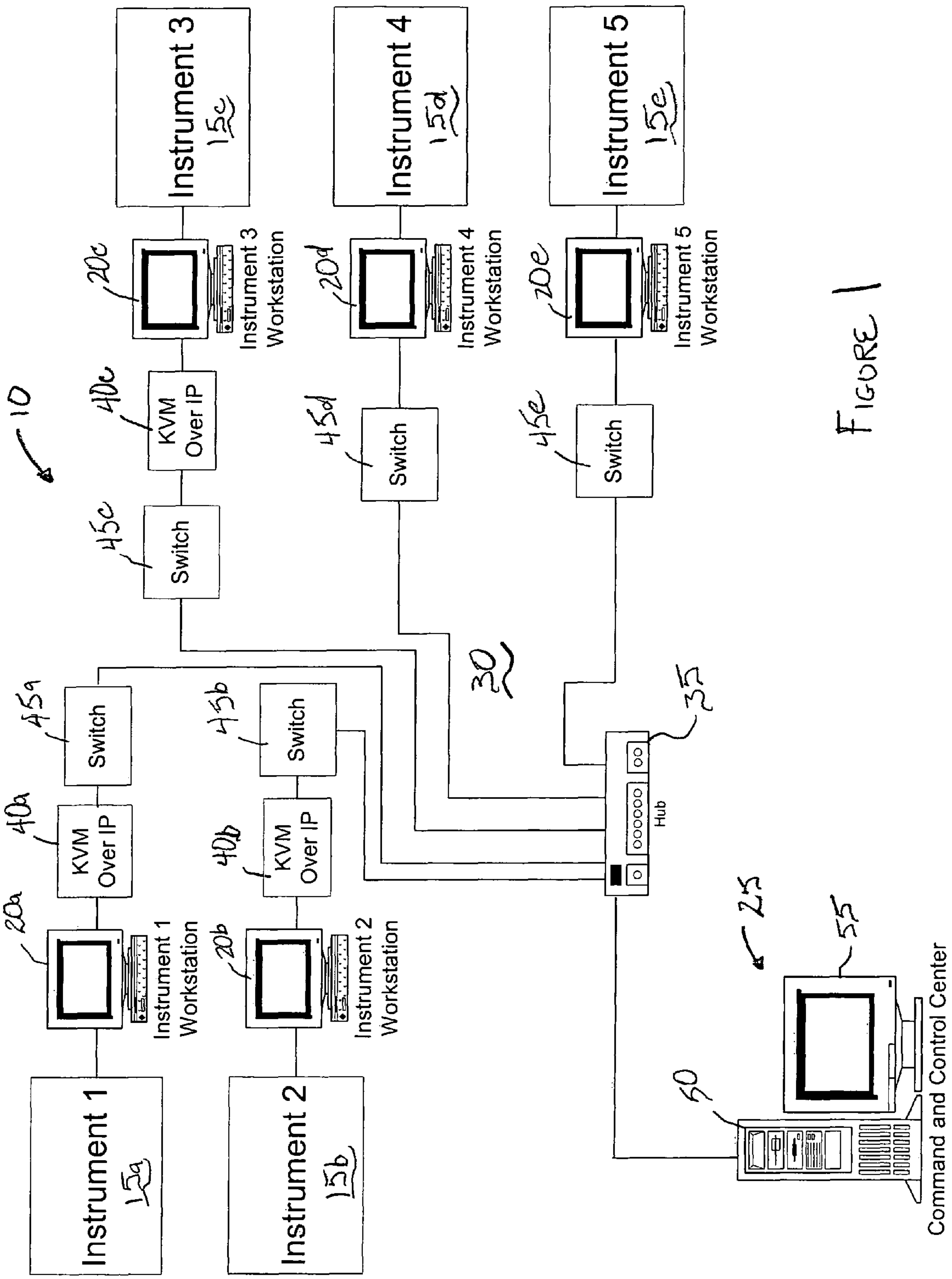
FIG. 1 is a schematic block diagram of one embodiment of a laboratory computer network constructed in accordance with the teachings of the present invention.

FIG. 1 is a schematic block diagram of one embodiment of a centralized laboratory instrument status monitoring and control network 10 constructed in accordance with the teachings of the present invention. As shown, the network 10 includes a plurality of laboratory instruments 15*a* through 15*e* that are adapted to execute a number of different sample preparation and analysis processes. Examples of such laboratory instruments 15*a* through 15*e* include a DxC800® system, an LX20Pro® system, an LXi725® system, a SYNCHRON CX® system, an ACCESS®, an ARRAY® 360CE system, an IMMAGE® system, a PARAGON CZE® system, etc., all of which are available from Beckman Coulter, Inc. Each instrument 15*a* through 15*e* is connected to a respective instrument workstation 20*a* through 20*e* that is specifically adapted to provide all requisite user interface functions needed for the operation of the instrument to which it is connected. Each instrument workstation 20*a* through 20*e* may include a computer operating system that is chosen for optimal interaction with the corresponding laboratory instrument 15*a* through 15*e*. Consequently, different instrument workstations 20*a* through 20*e* may employ different operating systems (i.e., Windows®, Phindows®, Linux®, etc.).

One of the user interface functions provided by each instrument workstation 20*a* through 20*e* is the provision of video screen data on a corresponding monitor of the workstation. Included in the video screen data of each instrument workstation 20*a* through 20*e* are one or more visual indicators of the operational status of the respective instrument 15*a* through 15*e*. These operational status indicators are presented locally on the corresponding monitors of each workstation 20*a* through 20*e*.

The instrument workstations 20*a* through 20*e* are connected to a central server 25 over a transmission medium, generally designated at 30. The transmission medium 30 is adapted to transmit video screen data from each of the plurality of laboratory instrument workstations 20*a* through 20*e* to the central server 25. In the illustrated embodiment, the transmission medium 30 is in the form of an ethernet network having one or more ethernet hubs 35. It will be recognized that the ethernet hub 35 can be replaced with an ethernet switch and that such hubs and switches are interchangeable for purposes of the present invention.

Instrument workstations 20_a_ through 20_c_ are connected to the ethernet hub 35 using respective keyboard-video-monitor (KVM) devices 40_a_ through 40_c_. In the illustrated embodiment, devices 40_a_ through 40_c_ are KVM-over-IP devices that are capable of providing video screen data from the respective instrument workstation. Each KVM-over-IP device 40_a_ through 40_c_ is connected to receive the video output from the video card of the respective instrument workstation 20_a_ through 20_c_. This video output signal is ultimately passed to the corresponding workstation monitor for display of the video screen data. Each KVM-over-IP device 40_a_ through 40_c_, upon request over the ethernet network, is also capable of returning data corresponding to one or more screen sections of the video screen data to the central server 25 using the IP format.

A switch 45_a_ through 45_c_ is disposed between each KVM-over-IP device 40_a_ through 40_c_ and the ethernet hub 35. The switches 45_a_ through 45_c_ allow each workstation 20_a_ through 20_c_ to be independently connected to or removed from the overall monitoring and control system 10.

Instrument workstations 20_d_ and 20_e_ are connected directly to the ethernet hub 35 through corresponding switches 45_d_ and 45_e_. Remote-control software residing on each instrument workstation 20_d_ and 20_e_ is used to transmit data corresponding to one or more screen sections of the video screen data of each workstation to the central server 25 using the IP format when a request for this information is made by the central server 25.

The transmission medium 30 of the illustrated embodiment is hardwired together using standard ethernet CAT5 cabling. However, one or more portions of the CAT5 cabling can be replaced by a wireless network system. For example, the output of each switch 45_a_ through 45_e_ may be connected to a wireless interface. Similarly, central server 25 may be connected to a corresponding wireless access point device that is compatible with the wireless interfaces. Suitable wireless interface formats include the 802.11a, 802.11b and 802.11g standards.

Central server 25 includes a central processing unit 50 and one or more monitors 55. Preferably, monitor 55 is in the form of a three panel LCD monitor including left-hand, center and right hand screens. Various input devices, such as a keyboard, mouse, touchscreen, etc., are also connected to the central processing unit 50 of the central server 25 to facilitate user interactions, such as alert acknowledgments, data input, menu selection, etc. Further, central processing unit 50 includes a network interface card or the like (wired or wireless) for connecting the unit 50 to the ethernet hub 35.

The central server 25 includes operational status monitoring software that is used to monitor and access instrument screens. The operational status monitoring software allows an operator to view alerts and access screens of connected instruments to check programming, test and reagent status, and other instrument specific information. To this end, the operational status monitoring software is adapted to monitor one or more screen sections of the video screen data respectively received from each of the plurality of laboratory instrument workstations 20_a_ through 20_e_. When the operational status monitoring software detects that one or more screen sections of the video screen data from a given laboratory instrument workstation is in a given visual state, an alert is provided to a user at the central server 25. The screen monitoring and alert functions provided by the operational status monitoring software, as will be apparent from the following discussion, can be implemented in a variety of manners without departing from the scope of the present invention.

Figure 2:
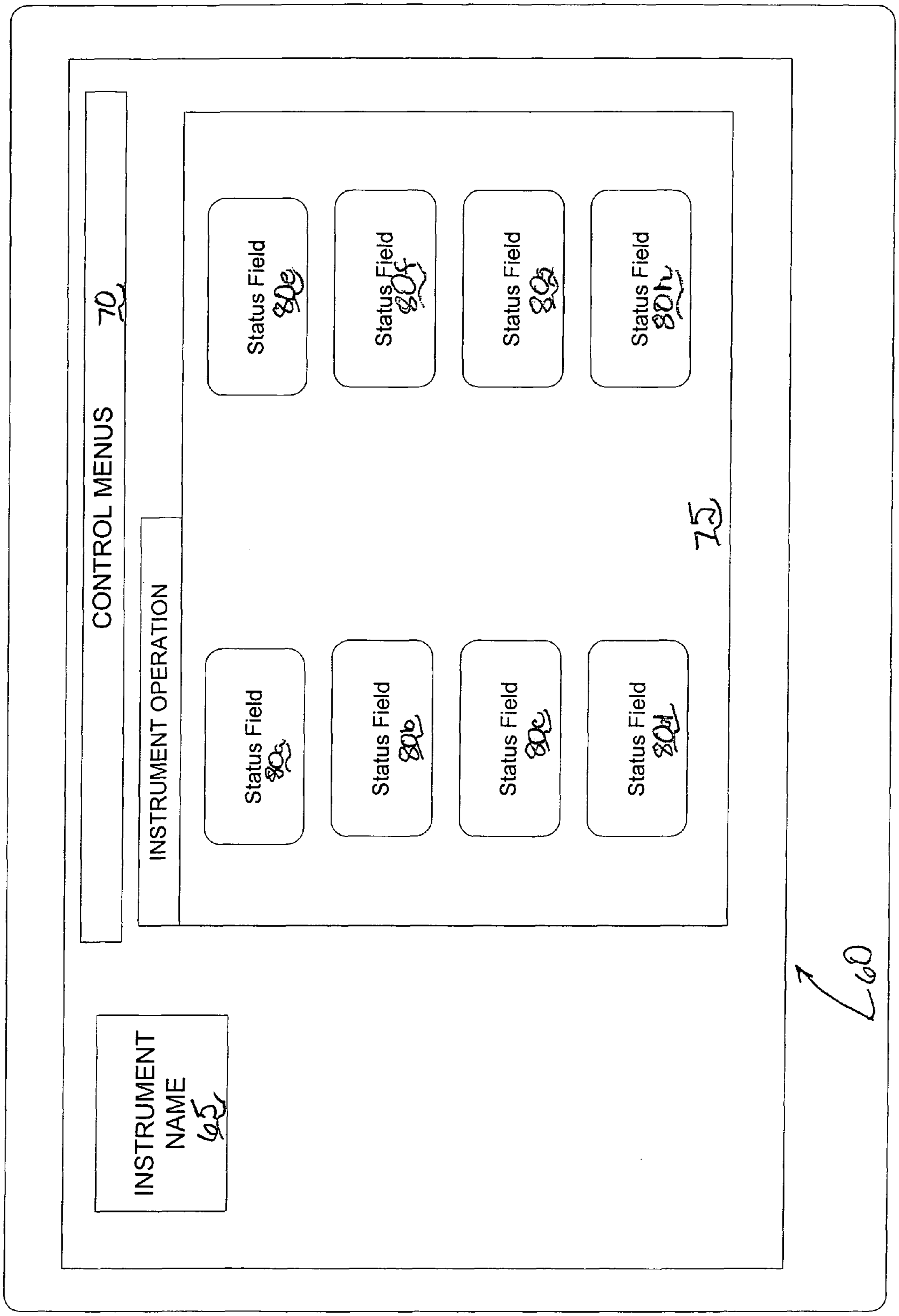
FIG. 2 is an exemplary layout for a video screen that may be used in connection with one or more of the laboratory instrument workstations shown in FIG. 1.

FIG. 2 illustrates one embodiment of a screen layout, shown generally at 60, that may be used to display status information and virtual control buttons associated with a given instrument workstation 20_a_ through 20_e_. In this screen layout, the name of the laboratory instrument is displayed in an instrument name section 65 of the screen 60. Control menu buttons 70 are disposed horizontally across a top section of the screen 60 and can be activated using, for example, a mouse, touch selection of buttons using a touchscreen, predetermined keyboard command sequences, etc.

Instrument operation section 75 includes a plurality of status fields 80_a_ through 80_h_. Status fields 80_a_ through 80_h_ provide the operator with textual and other visual indications corresponding to the operational status of the respective laboratory instrument. A change in the operational status of a particular aspect of the respective laboratory instrument results in a change in the status field corresponding to that particular operational aspect. For example, the text of a status field may change in response to a particular operational status change. Additionally, or in the alternative, the color of the text or background of the status field may change. In each instance, a change in the operational status of the respective laboratory instrument results in a corresponding change in the visual attributes of one or more of the status fields 80_a_ through 80_h_.

Figure 3A:
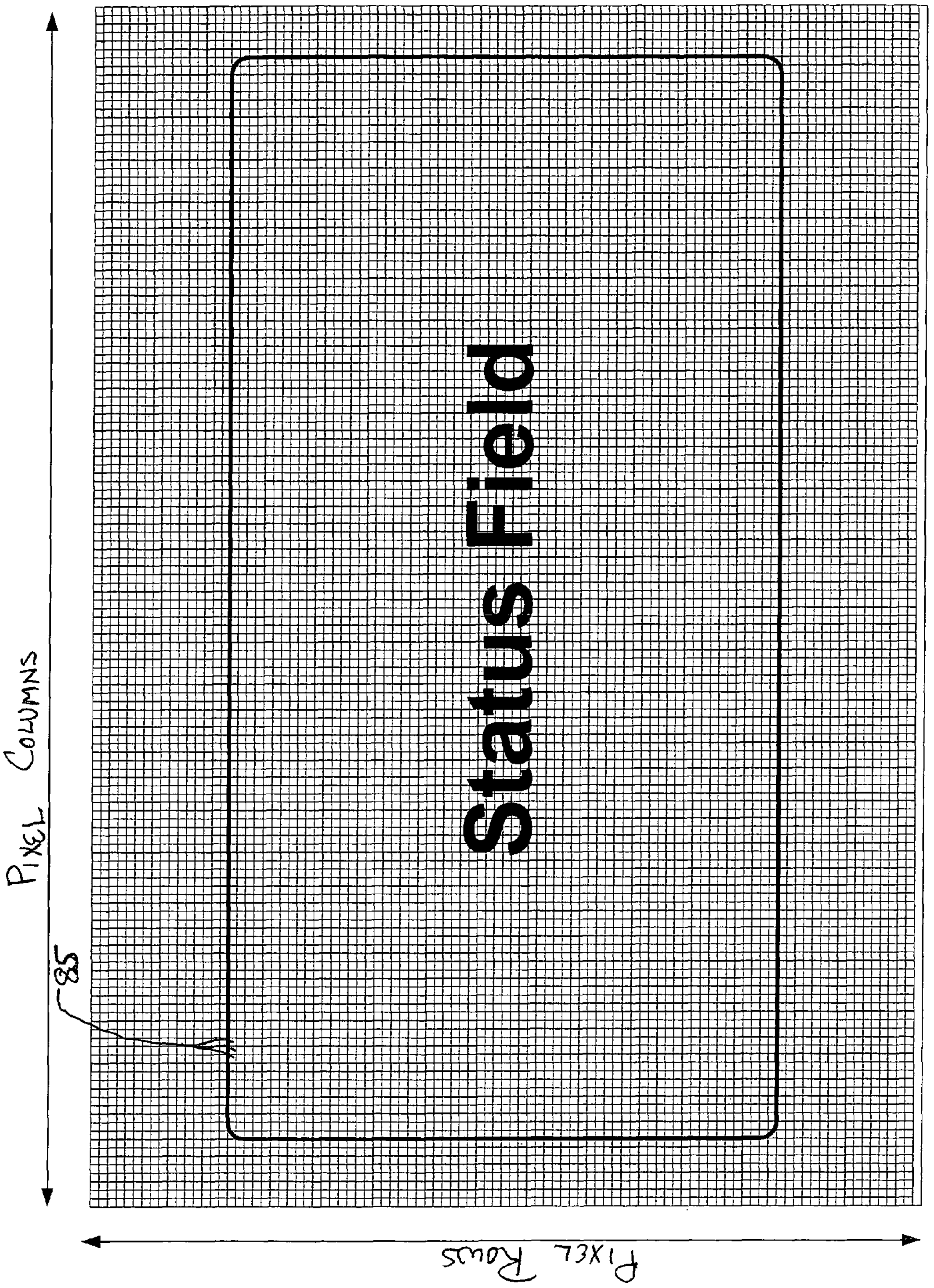
FIGS. 3A and 3B illustrate pixel arrays associated with a status field of the video screen shown in FIG. 2 during a non-alert condition and an alert condition, respectively.
Figure 3B:
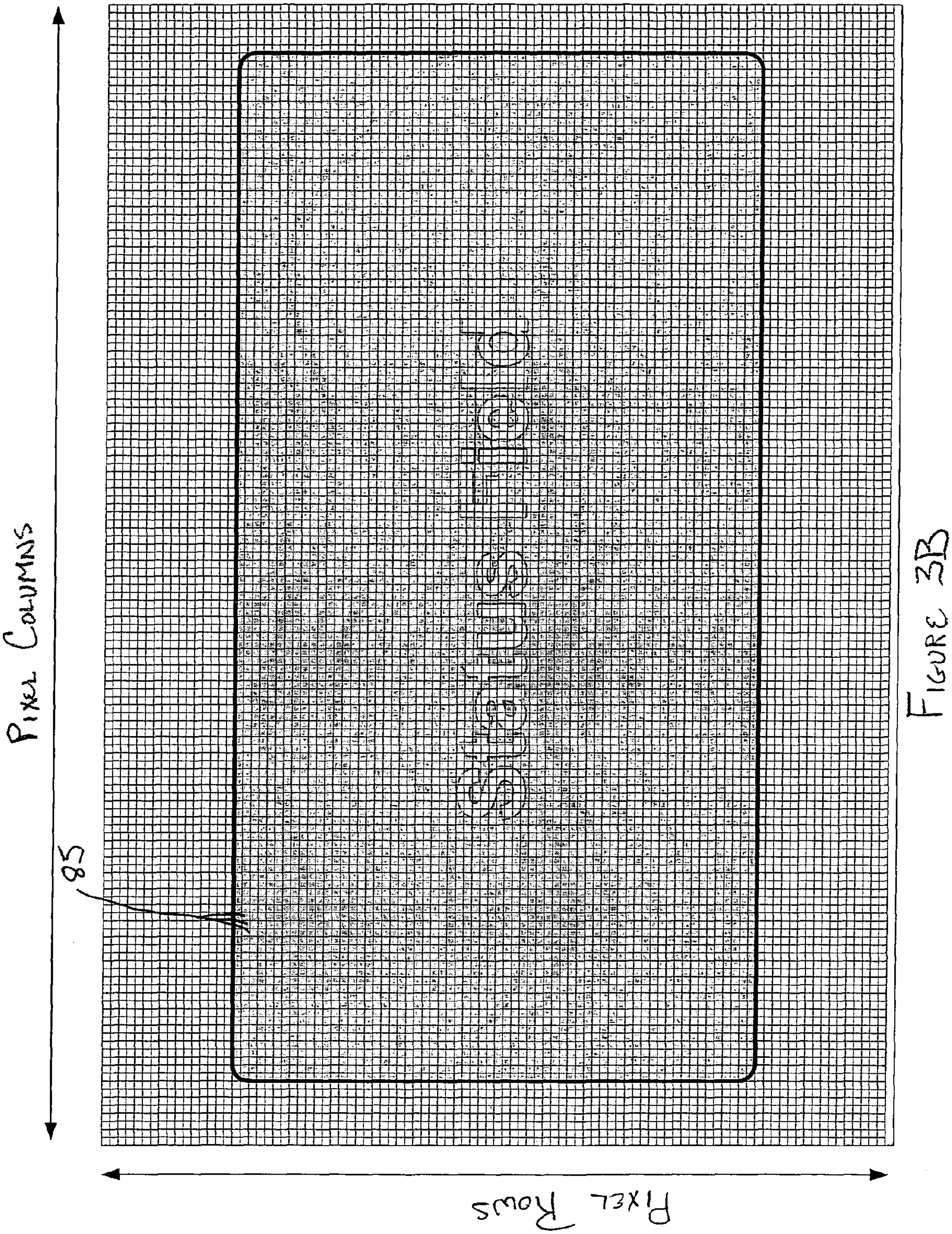

FIGS. 3A and 3B are close-up views of status field 80_a_. FIG. 3A illustrates the visual appearance of status field 80_b_ when the respective laboratory instrument is operating normally while FIG. 3B illustrates the visual appearance of status field 80_b_ when the operational status of the respective laboratory instrument requires the attention of a laboratory worker. As shown, the section of the video screen that includes status field 80_b_ comprises a plurality of individual pixels 85. In the illustrated embodiment, status field 80_a_ can be organized into an array of individual pixels having different data values. The data values can be addressed by their corresponding row and column indices within the pixel array.

A comparison between FIGS. 3A and 3B shows that the color of both the text and the background of status field 80_b_ change when the operational status of the respective laboratory instrument has changed. As such, the data values within the pixel array differ between the operational conditions. By monitoring data values of at least a portion of the pixel array corresponding to the status field 80_b_ and comparing them to a predetermined data value set, the operational status monitoring software in the central server 25 can detect a change in the operational status of the corresponding laboratory instrument and provide an alert to a user at the central server 25.

Figure 4:
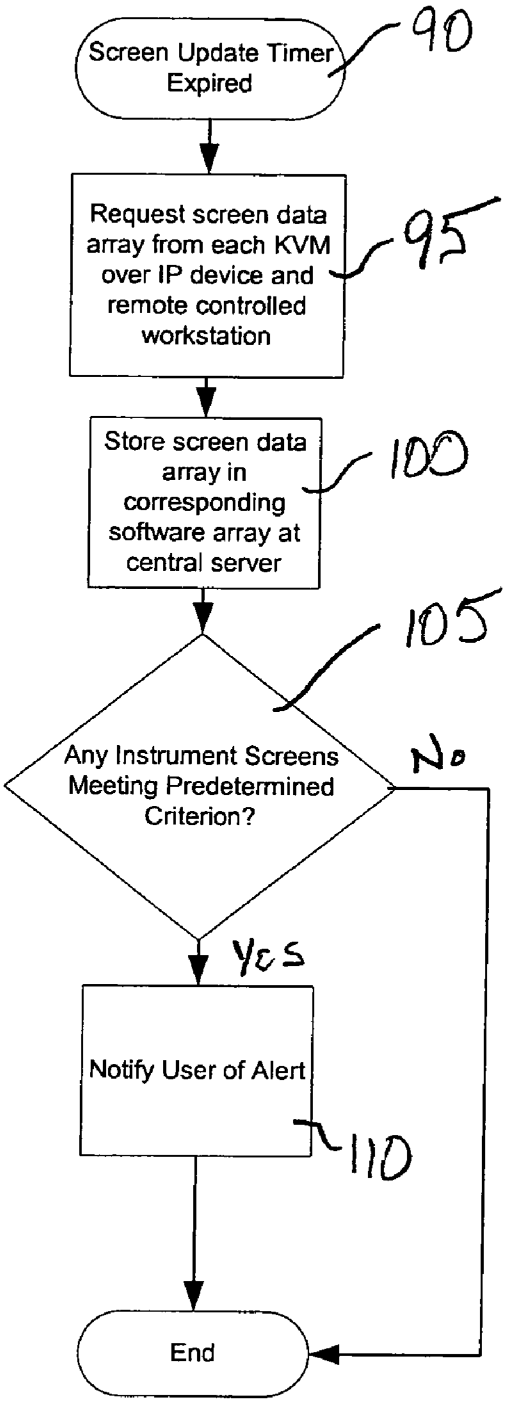
FIG. 4 is a flowchart illustrating one manner in which the operational status monitoring software may execute the functionality associated with the central server shown in FIG. 1.

FIG. 4 is a flowchart illustrating one manner in which the operational status monitoring software may execute the foregoing functionality. In this particular embodiment, a check of the visual status of the video screen of each laboratory instrument workstations 20_a_ through 20_e_ is initiated at step 90 by the expiration of a screen update timer. When this occurs, the central server 25 transmits a screen request over the transmission media 30 to each of the KVM-over-IP devices 40_a_ through 40_c_ as well as to the remote-control software running in each of the laboratory instrument workstations 20_d_ and 20_e_. This operation is reflected at step 95.

Upon receiving the video screen data, the central server 25 determines whether any of the video screens meet predetermined alert criterion. This can be accomplished in accordance with any one of a number of different processes. For example, in the embodiment shown in FIG. 4, the screen data corresponding to the video screen of each laboratory instrument workstation 20_a_ through 20_e_ may be stored in respective software variable arrays at the central server 25. The software variable arrays may be stored in the random access memory of the central server 25 or on magnetic media, such as a hard drive, of the central server 25. This operation is shown at step 100. A check is then made of each software variable array at step 105 to determine whether the data in the array, or any portion thereof, meets predetermined criteria. The predetermined criteria may be the same or different for each of the laboratory instrument workstations 20*a* through 20*e*. For example, the operational status monitor software may go to a predetermined index in a given software variable array to check whether a video element on the video screen of the corresponding laboratory instrument workstation is a particular color. Multiple indices may be checked to provide a more robust decision on whether a given status alert is needed. Further, multiple indices may be checked to determine whether different, multiple status alerts are needed. If the comparison made at step 105 indicates that one or more status alert conditions have occurred at the laboratory instrument workstations 20*a* through 20*e*, the operational status monitoring software provides corresponding alerts at the central server 25. This alert operation is shown at step 110.

FIG. 4 is an exemplary process in which the video screen data is, in effect, batch processed. However, it will be recognized that the video screen data from each laboratory instrument may be processed on individual bases as well. To this end, the video screen data from each laboratory instrument workstation 20*a* through 20*e* may be requested in response to the expiration of respective screen update timers. Steps 95 through 110 would then be executed solely for the laboratory instrument workstation for which the timer expired.

Other manners of using the screen data received from the KVM-over-IP devices 40*a* through 40*c* and laboratory instrument workstations 20*d* and 20*e* may also be employed to determine whether a status alert should be presented at the central server 25. For example, the video screen data received at the central server 25 may be stored as a program readable data file in random access memory or on magnetic media. The data in one or more portions of the data file may then be compared to predetermined criteria to determine whether a status alert is indicated.

The comparison executed at step 105 may also be implemented in an alternative manner to the one described above. For example, the data values of each software variable array may be compared to a fixed value array. Whether a status alert is indicated depends on the degree of correlation between the arrays. In this manner, the existence of specific text in a screen region can be monitored. The fixed value array may have data values corresponding to the shape of a plurality of letters representing the text criterion. If the correlation between the fixed value array and software variable array for the screen region is high, it is likely that the laboratory instrument workstation is displaying the target text in the screen region be monitored. By performing a correlation between the arrays as opposed to a direct comparison, minor shifts in the position of the screen of the laboratory instrument workstation do not prevent an alert from being detected. Alternative screen position compensation techniques include column or row shifting of either or both the arrays prior to executing a comparison or correlation operation.

Figures 5A, 5B, 5C:
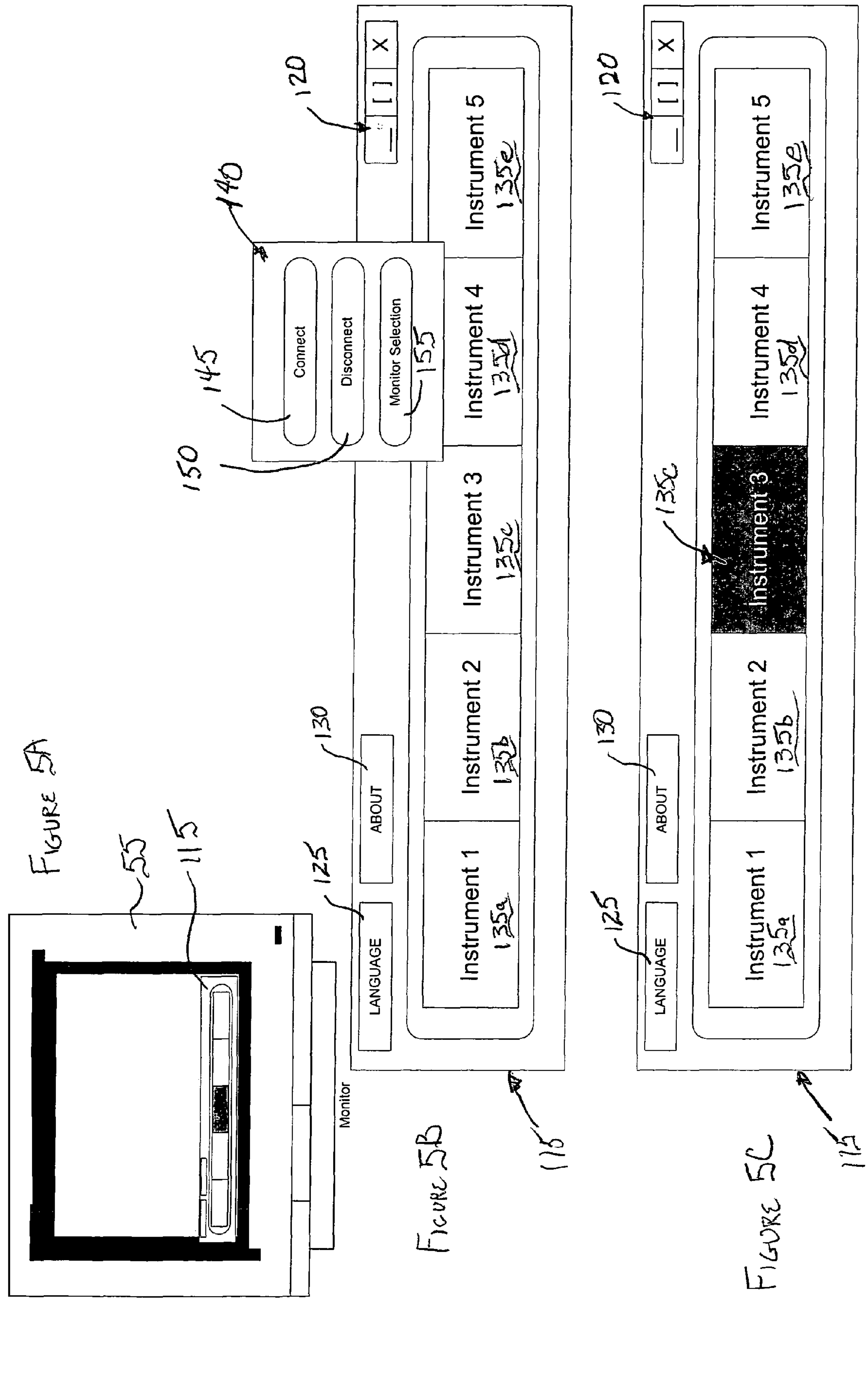
FIGS. 5A through 5C and 6 illustrate the operation of one embodiment of a general user interface that may be implemented in the software of the central server shown in FIG. 1.

FIGS. 5A, 5B and 5C illustrate an exemplary general user interface (GUI) suitable for use by the operational status monitoring software at the central server 25. As shown in FIG. 5A, the GUI comprises an application bar 115 that initially appears at the bottom of monitor 50 when the operational status monitoring software is started. As shown in FIG. 5B, the application bar 115 complies with standard protocols and includes a window region 120 having virtual buttons to minimize, maximize and close the application bar 115. Virtual button 125 brings up a menu that allows the user to select the language that will be used by the GUI while virtual button 130 displays a window providing version information for the operational status monitoring software.

During initialization and at predetermined times thereafter, the operational status monitoring software scans the network 10 to identify active laboratory instrument workstations. Whether a laboratory instrument workstation is active can be determined, for example, based on whether the central server 25 receives video screen data from the workstation. In such instances, screen saver functions should be turned off at the individual workstations.

The operational status monitoring software presents a virtual button 135*a* through 135*e* for each active workstation that it detects. If a workstation is inactive, the corresponding virtual button may be "greyed out" to indicate the inactive state of the workstation to the user at the central server 25. Pressing a virtual button 135*a* through 135*e* using the right hand mouse button causes the software to present a corresponding menu 140 that provides the user with a number of selections for the respective laboratory instrument workstation. In the illustrated embodiment, virtual button 145 is used to direct the operational status monitoring software to activate the connection to the respective laboratory instrument workstation while virtual button 150 directs the software to render the connection with the respective workstation inactive.

Virtual button 155 is used in multiple monitor environments to select which monitor is to display the video screen received from the respective laboratory instrument workstation. To this end, activation of virtual button 155 can bring up a menu that allows the user to select the monitor on which the video screen is to be displayed. Alliteratively, activation of virtual button 155 may be used to immediately direct the video screen received from the respective laboratory instrument workstation to a predetermined one of the plurality of monitors, such as the center display of a three panel LCD monitor.

When the operational status monitoring software detects that an alert is indicated for a particular laboratory instrument workstation, the alert may be presented to the user at the central server 25 in a number of different manners. For example, with reference to FIG. 5C, the visual appearance of virtual button 135*c* has changed to indicate an alert in connection with laboratory instrument workstation 20*c*. In the illustrated embodiment, the change in the visual appearance results, at least in part, from a change in the background color of the virtual button 135*c*. The operational status monitoring software may also be used to classify an alert by its degree of importance. In such instances, the background color of a virtual button 135*a* through 135*e* changes to a color indicative of the degree of importance of the alert. Conventional color selections include yellow backgrounds for minor alerts and red backgrounds for major alerts.

Figure 6:
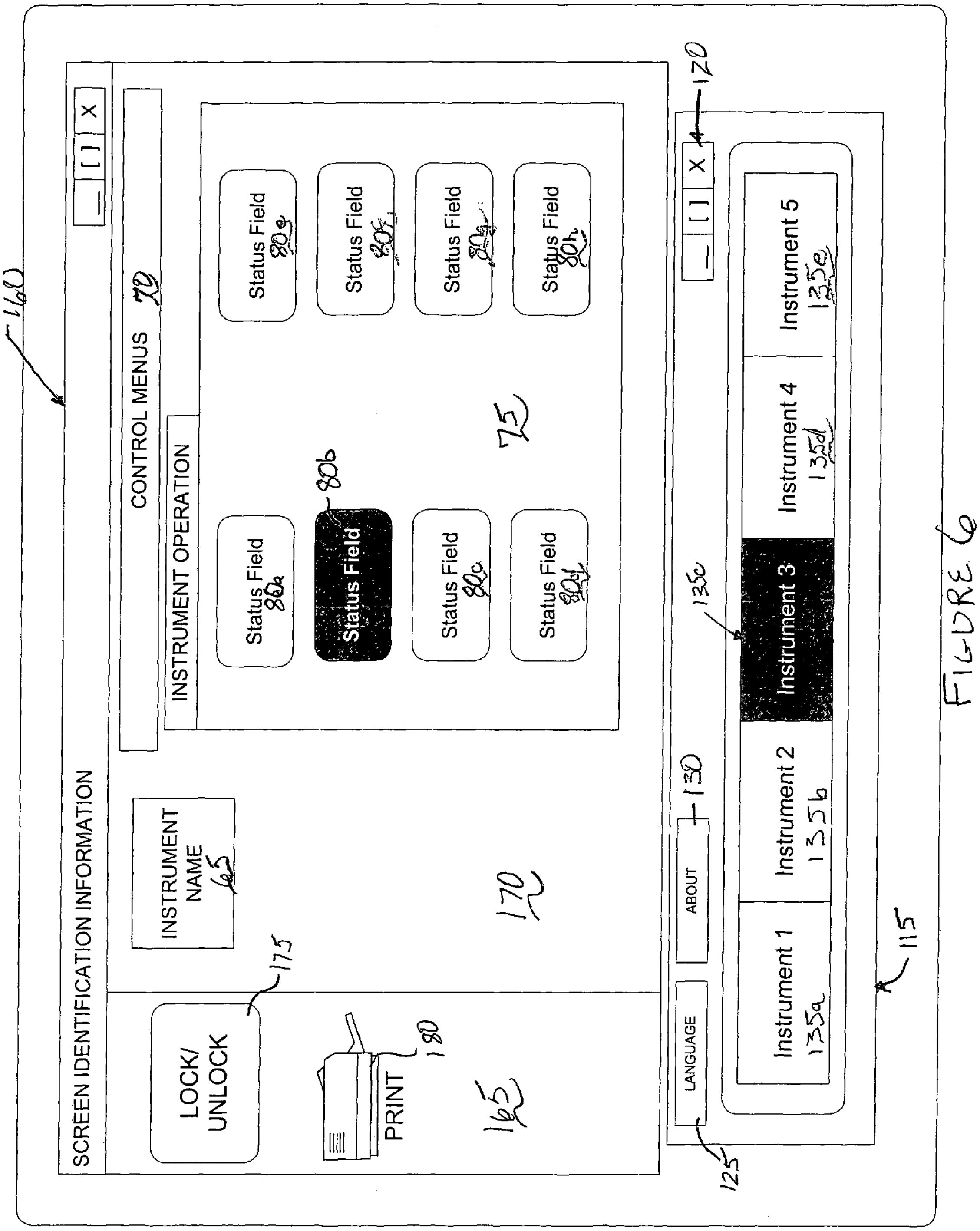

Activation of a virtual button 135*a* through 135*e* using the left-hand mouse button directs the operational status monitoring software to display the video screen from the respective laboratory instrument workstation on a monitor 55 of the central server 25. One example of such a display on the monitor 55 is shown in FIG. 6. In this example, application bar 115 is displayed below a further window, shown generally at 160. Window 160 is comprised of two sections 165 and 170. Section 170 directly corresponds to the video screen of the laboratory instrument workstation 20*a* through 20*e* that has had its virtual button 135*a* through 135*e* activated. For purposes of this example, it is assumed that virtual button 135*c* has been activated so that the user may ascertain which status alert has occurred at laboratory instrument workstation 20*c*. This example also assumes that the screen of laboratory instrument workstation 20*c* corresponds to the screen layout shown in FIG. 2. However, it will be recognized that other screen layouts may be shown in section 170 depending on the particular laboratory instrument workstation 20*a* through 20*e* that has been selected using virtual buttons 135*a* through 135*e*. It will also be apparent that multiple windows 160 may be concurrently displayed for different laboratory instrument workstations, particularly where the central server 25 includes multiple monitors. In the illustrated example, activation of virtual button 135*c* has revealed that status field 80*b* of laboratory instrument workstation 20*c* triggered the alert at the central server 25.

Screen section 165 of window 160 includes two virtual buttons 175 and 180. Virtual button 175 is used to either lock or unlock screen section 170 for user interaction with the corresponding laboratory instrument workstation 20*a* through 20*e*. When locked, a user at the central server 25 cannot activate any of the virtual buttons of screen section 170 and, therefore, cannot interact with the corresponding laboratory instrument workstation. When unlocked, keyboard, mouse selections, and any other inputs generated by the user at the central server 25 are sent along transmission medium 30 for processing at the corresponding laboratory instrument workstation thereby allowing the user to fully interact with the workstation through the menus and buttons provided for the workstation in section 170. Virtual button 180 prints screen 170.

The central server 25 may be enhanced by the addition of further networking software that simplifies management of the laboratory environment. For example, central server 25 may include software, such as the DL2000® management software system described above, which collects and manages data and workflow for a number of different laboratory instruments. The data management capabilities may include automatic results validation, delta checking, reflex testing, quality control, results editing, and archiving and restoring of patient results.

The central server 25 may also be adapted with remote-control software that allows technicians at a remote site to view the central server and troubleshoot any problems. Remote access to the central server 25 can be provided over a modem, the internet, a VPN, a WAN, etc.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. A laboratory computer network comprising:

a plurality of laboratory instrument workstations connected to respective laboratory instruments, each laboratory instrument workstation being adapted to provide video screen data comprising one or more pixel values of a predetermined screen section, said one or more pixel values indicative of the operational status of the respective laboratory instrument;

transmission media adapted to transmit said video screen data from each of said plurality of laboratory instrument workstations; and a central server adapted to receive said video screen data from said transmission media, said central server adapted to monitor said one or more pixel values of said predetermined screen section of the video screen data respectively received from said plurality of laboratory instrument workstations and to provide an indication of a change of state of said one or more pixel values, wherein said change of state corresponds to a change in the operational status of the respective laboratory instrument.

2. A laboratory computer network as claimed in claim 1 wherein at least two of said plurality of laboratory instrument workstations have different operating systems.

3. A laboratory computer network as claimed in claim 1 wherein said transmission media comprises:

a KVM-over-IP switch connected to receive at least video screen data from at least one of said plurality of laboratory instrument workstations; and means for transmitting data from said KVM-over-IP switch to said central server.

4. A laboratory computer network as claimed in claim 3 wherein said means for transmitting comprises:

an ethernet switch;

a first ethernet cable having a first end connected to said KVM-over-IP switch and a second end connected to said ethernet switch;

a second ethernet cable having a first end connected to said ethernet switch and a second end connected to said central server.

5. A laboratory computer network as claimed in claim 3 wherein said means for transmitting comprises a wireless network.

6. A laboratory computer network as claimed in claim 1 wherein said transmission media comprises a wireless network.

7. A laboratory computer network as claimed in claim 1 wherein at least one of said plurality of laboratory instrument workstations comprises remote-control software for transmitting respective video screen data along said transmission media to said central server.

8. A laboratory computer network as claimed in claim 1 wherein said central server further comprises data management software adapted to collect and manage data and workflow for one or more of said laboratory instruments.

9. A laboratory computer network as claimed in claim 1 wherein said central server provides said indication in response to a given color of said screen section.

10. A laboratory computer network as claimed in claim 1 wherein said central server comprises at least one video monitor, said central server presenting virtual buttons respectively associated with each of said plurality of laboratory instrument workstations on said at least one video monitor, said indication comprising a change in the visual appearance of the virtual button for the laboratory instrument workstation upon said change of state of said one or more pixel values.

11. A laboratory computer network as claimed in claim 10 wherein activation of said virtual buttons causes said central server to display the video screen of the respective laboratory instrument workstation on said at least one video monitor.

12. A laboratory computer network as claimed in claim 1 wherein said central server includes a video monitor, said central server further adapted to allow a service technician at a remote site to view said video monitor.

13. A laboratory computer network as claimed in claim 1 wherein said central server includes a video monitor, said central server further adapted to display on said video monitor the video screen data of a selected one of the plurality of laboratory instrument workstations and to allow control of said respective laboratory instrument workstation from said central server.

14. A laboratory computer network as claimed in claim 13 wherein said central server is further adapted to display on said video monitor a virtual button and to allow control of said respective laboratory instrument workstation from said central server upon activation of said virtual button.

15. A laboratory computer network as claimed in claim 1 wherein said central server is adapted to monitor said one or more pixel values from said plurality of laboratory instrument workstations concurrently.

16. A laboratory computer network comprising:

a plurality of laboratory instrument workstations connected to respective laboratory instruments, each laboratory instrument workstation being adapted to provide video screen data to a video monitor connected to said laboratory instrument workstation, wherein the visual state of a predetermined screen section of the video screen data is indicative of the operational status of the respective laboratory instrument;

transmission media adapted to transmit said video screen data from each of said plurality of laboratory instrument workstations; and a central server adapted to receive said video screen data from said transmission media, said central server storing said predetermined screen section of said video screen data received from at least one of said plurality of laboratory instrument workstations into a software variable array readable by a computer program operating in said central server, said computer program further adapted to monitor said software variable array and to generate an alert based on a degree of correlation between said software variable array and a predetermined fixed value array, the predetermined fixed value array indicative of a change in the operational status of the respective laboratory instrument.

17. A laboratory computer network as claimed in claim 16 wherein said central server stores said predetermined screen section on a temporary basis.

18. A laboratory network as claimed in claim 16 wherein said central server comprises random access memory, said software variable array being stored in said random access memory.

19. A laboratory computer network as claimed in claim 16 wherein said central server comprises a central video monitor, said central server adapted to presenting on said central video monitor virtual buttons respectively associated with each of said plurality of laboratory instrument workstations, said central server further adapted to simultaneously display on said central video monitor said virtual buttons and said video screen data of the respective laboratory instrument workstations upon activation of said virtual buttons.

20. A laboratory computer network as claimed in claim 16 wherein said central server comprises at least two central video monitors, said central server adapted to present virtual buttons respectively associated with each of said plurality of laboratory instrument workstations on one of said at least two central video monitors and wherein activation of said virtual buttons causes said central server to display the video screen of the respective laboratory instrument workstation on another of said at least two central video monitors.

21. A central computer station for use in a laboratory network, the central computer station comprising:

a network interface adapted to receive video screen data comprising pixel values, the video screen data indicative of the operational status of a plurality of laboratory instrument workstations connected to respective laboratory instruments, wherein a first visual state of a predetermined screen section of the video screen data indicates a first operational state of the respective laboratory instrument, and wherein a second visual state of said predetermined screen section indicates a second operational state of the respective laboratory instrument;

operational status monitoring software adapted to monitor said pixel values of said predetermined screen section of the video screen data respectively received from each of said plurality of laboratory instrument workstations; and a video monitor controlled by said operational status monitoring software, wherein said operational status monitoring software is further adapted to provide an indication on said video monitor when said operational status monitoring software determines that said predetermined screen section received from one of said plurality of laboratory instrument workstations has changed to said second visual state based on said monitored pixel values.

22. A central computer station as claimed in claim 21 wherein said operational status monitoring software provides said indication in response to a predetermined color of a first screen section of one of the plurality of laboratory instrument workstations or of a second screen section of another of the plurality of laboratory instrument workstations, wherein the first screen section and the second screen section are different portions of the video screen data.

23. A central computer station as claimed in claim 21 wherein said operational status monitoring software is further adapted to presenting virtual buttons respectively associated with each of said plurality of laboratory instrument workstations on said video monitor, said indication comprising a change in the visual appearance of the virtual button for the laboratory instrument workstation, wherein the change in said visual appearance is a change to a yellow background color for minor alerts and a change to a red background color for major alerts.

24. A central computer station as claimed in claim 21 wherein said operational status monitoring software is further adapted to determine which of said plurality of laboratory instrument workstations are active based on whether said network interface receives video screen data from the respective laboratory instrument workstation.

25. A central computer station as claimed in claim 21 wherein said video screen data of one or more of said plurality of laboratory instrument workstations comprises a plurality of predetermined screen sections, each predetermined screen section indicative of a different operational state of the respective laboratory instrument.

26. A central computer station as claimed in claim 25 wherein said screen monitoring software is further adapted to provide an indication on said video monitor of a particular operational state of said respective laboratory instrument based on which of the plurality of predetermined screen sections undergoes a predetermined change in said pixel values.

* * * * *